United States Patent
Mitarai et al.

(10) Patent No.: US 11,182,423 B2
(45) Date of Patent: Nov. 23, 2021

(54) INFORMATION PRESENTATION METHOD AND APPARATUS

(71) Applicant: CANON KABUSHIKI KAISHA, Tokyo (JP)

(72) Inventors: Yusuke Mitarai, Tokyo (JP); Masakazu Matsugu, Yokohama (JP); Atsushi Nogami, Kawasaki (JP); Masafumi Takimoto, Kawasaki (JP); Tomotaka Fujimori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 16/061,186

(22) PCT Filed: Nov. 21, 2016

(86) PCT No.: PCT/JP2016/084457
§ 371 (c)(1),
(2) Date: Jun. 11, 2018

(87) PCT Pub. No.: WO2017/098908
PCT Pub. Date: Jun. 15, 2017

(65) Prior Publication Data
US 2018/0373738 A1 Dec. 27, 2018

(30) Foreign Application Priority Data
Dec. 11, 2015 (JP) .............................. JP2015-242645

(51) Int. Cl.
*G06F 7/00* (2006.01)
*G06F 16/58* (2019.01)
(Continued)

(52) U.S. Cl.
CPC ......... *G06F 16/5866* (2019.01); *G01N 21/88* (2013.01); *G06F 16/00* (2019.01); *G06F 16/90* (2019.01); *G06T 7/0004* (2013.01)

(58) Field of Classification Search
CPC ...... G06F 16/5866; G06F 16/90; G06F 16/00; G01N 21/88; G06T 7/0004
See application file for complete search history.

(56) References Cited

U.S. PATENT DOCUMENTS 7,032,816 B2 * 4/2006 Markham .............. G06Q 10/00
235/375
7,920,124 B2 4/2011 Tokita et al.
(Continued)

FOREIGN PATENT DOCUMENTS

JP 2003195925 A 7/2003
JP 2009195925 A 7/2003
(Continued)

OTHER PUBLICATIONS

J. Jeon, V. Lavrenko and R.Manmatha, "Automatic Image Annotation and Retrieval using Cross-Media Relevance Models", SIGIR '03, pp. 119-126, 2003.
(Continued)

Primary Examiner — Azam M Cheema
(74) Attorney, Agent, or Firm — Venable LLP

(57) ABSTRACT

An information presentation apparatus obtains monitoring information that indicates a state of a monitoring target, accumulates it in a storage unit, and detects, based on the monitoring information accumulated in the storage unit, the occurrence of an information presentation trigger event. The information presentation apparatus generates, based on the monitoring information accumulated in the storage unit, search data for searching for relevant information related to the detected event, uses the generated the search data to search for the relevant information, and generates presentation information for present the relevant information found by the searching.

18 Claims, 11 Drawing Sheets

(51) Int. Cl.
*G06F 16/00* (2019.01)
*G06F 16/90* (2019.01)
*G01N 21/88* (2006.01)
*G06T 7/00* (2017.01)

(56) References Cited

U.S. PATENT DOCUMENTS

| | | | |
|---|---|---|---|
| 9,626,285 | B2 | 4/2017 | Noro et al. |
| 2005/0175231 | A1 | 8/2005 | Hirata et al. |
| 2009/0276285 | A1* | 11/2009 | Nomula .............. G06F 16/951 705/14.52 |
| 2014/0006226 | A1* | 1/2014 | Katsube .............. G06Q 10/087 705/28 |
| 2015/0092052 | A1* | 4/2015 | Shin .................. G06K 9/00771 348/143 |
| 2015/0135312 | A1* | 5/2015 | Wada .................. G06F 11/3409 726/22 |

FOREIGN PATENT DOCUMENTS

| | | |
|---|---|---|
| JP | 2003344300 A | 12/2003 |
| JP | 2008269215 A | 11/2008 |
| JP | 2009201014 A | 9/2009 |
| JP | 2009283580 A | 12/2009 |
| JP | 2013148962 A | 8/2013 |

OTHER PUBLICATIONS

S. L. Feng, R. Manmatha and V.Lavrenko, "Multiple Bernoulli Relevance Models for Image and Video Annotation", CVPR '04, pp. 1002-1009,vol. 2, 2004.

Hirotaka Hachiya and Masakazu Matsugu, "NSH: Normality Sensitive Hashing for Anomaly Detection", ICCVW '13,pp. 795-802, 2013.

Yamanishi, Kenji et al.. Statistical anomaly detection 3 methods, Information Processing 1 2005, vol. 46, No. 1, Information Processing Society of Japan, Jan. 15, 2005, pp. 34-39.

International Search Report & Written Opinion issued in parent International Application No. PCT/JP2016/084457 dated Dec. 20, 2016.

* cited by examiner

[Fig. 1]
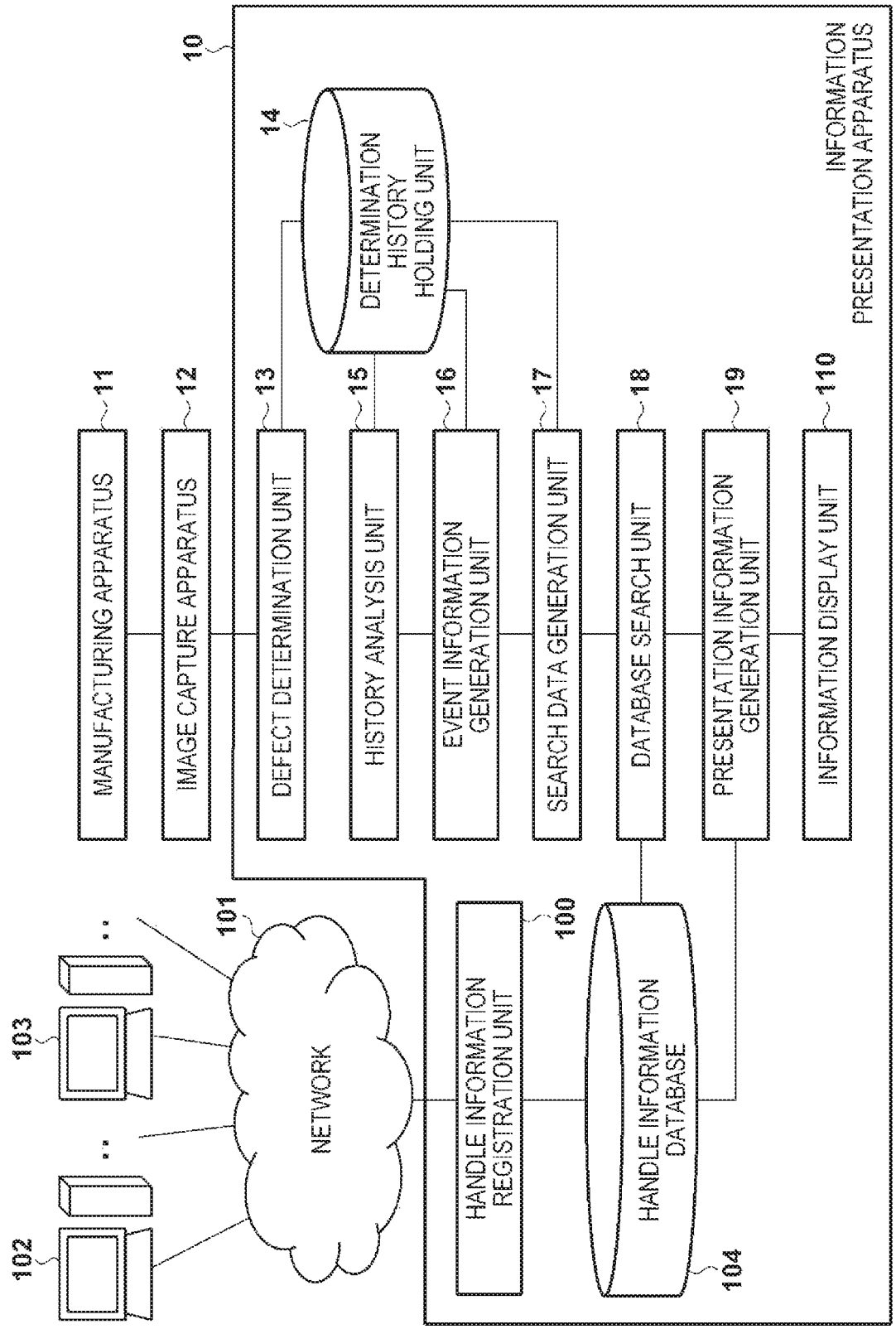

[Fig. 2]
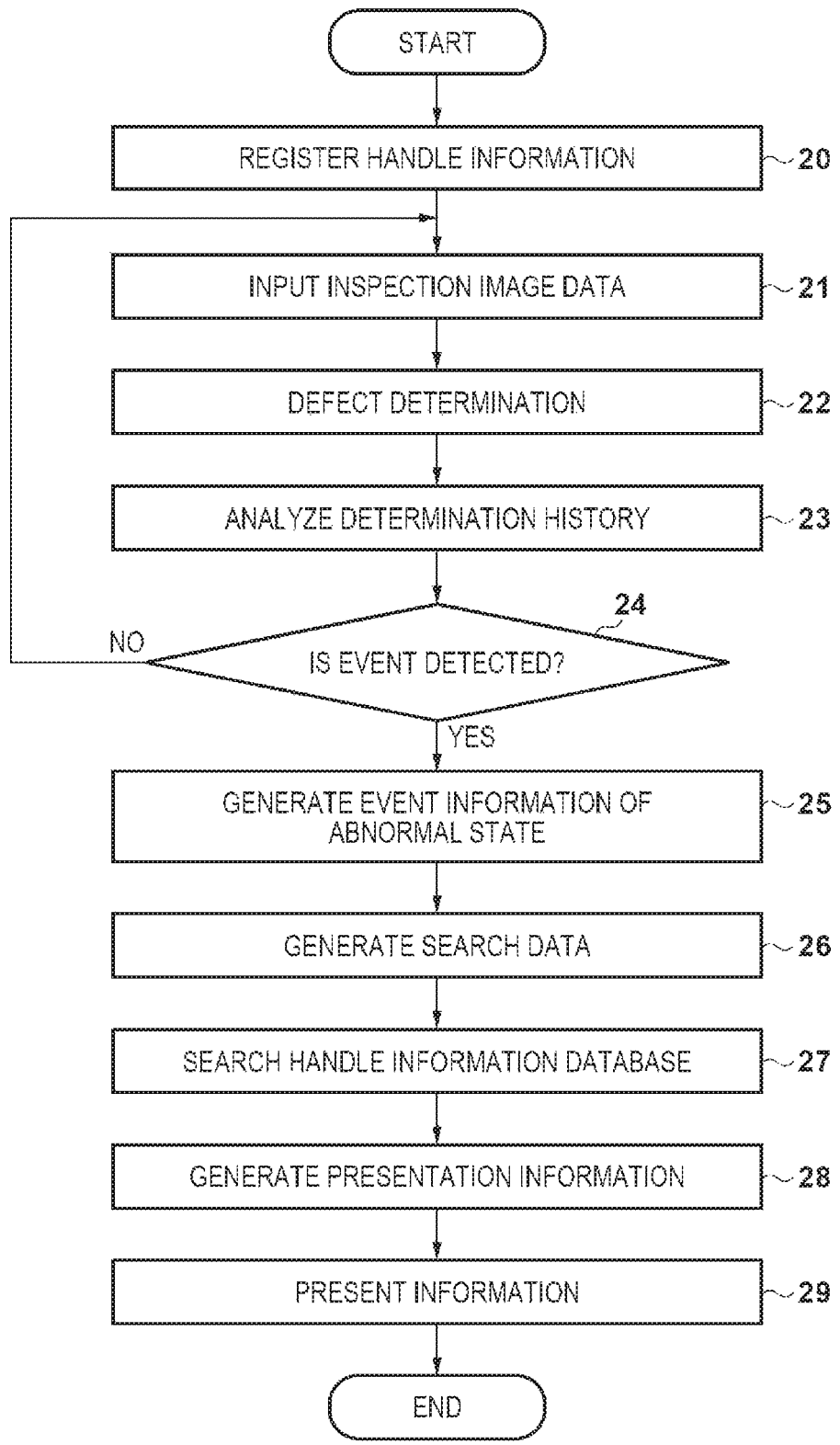

[Fig. 3]

| MATCHED RELATED EVENT | YOUR COMPANY'S CORRESPONDING EVENT | |
|---|---|---|
| 311 ⭕ | 321 | 331 "CRACKING MAY BE FREQUENTLY OCCURRING. AS A CAUSE, FAST SPEED OF EJECTION, HIGH PRESSURE, AND LOW PRESSURE OF THE MOLD OR RESIN CAN BE CONSIDERED. FOR A STRATEGY, FOR EXAMPLE INCREASING THE MOLD TEMPERATURE MAY BE RAISED. DETAILED INFORMATION IS HERE: https://kanagata-kaizen.com/crack/" |
| 312 | 322 | 332 "BAD FILLING MAY BE FREQUENTLY OCCURRING AS A CAUSE, FOR EXAMPLE LOW FILLING PRESSURE OR FILLING SPEED, OR LOW FILLED RESIN AMOUNT MAY BE CONSIDERED. FOR A STRATEGY, FOR EXAMPLE INCREASING INJECTION SPEED MAY BE GIVEN. DETAILED INFORMATION IS HERE: http://mold-tech.com/short-s/" |
| 313 | 323 | 333 "A FLOWMARK PHENOMENON IS A PHENOMENON IN WHICH LINES OCCUR IN RESIN PARTS TO MERGE, AND MAY BE OCCURRING DUE TO A CAUSE SUCH AS LOW EJECTION SPEED OR LOW RESIN/MOLD TEMPERATURE. IF A CHANGE TO THE THICKNESS OF A FORMED PRODUCT IS LARGE, THIS PHENOMENON... DETAILED INFORMATION IS HERE: http://abs-injection.co.jp/f-mark/" |
| 314 | 324 | 334 BAD LUSTER MAY BE FREQUENTLY OCCURRING. AS A CAUSE, MIXING OF IMPURITIES OR CLEANING SOLUTION, ... |

EVENT DETECTED: OCCURRENCE FREQUENCY OF A PARTICULAR TYPE OF DEFECT ("CRACK DEFECT") IS INCREASING! — 34

30

[Fig. 4]
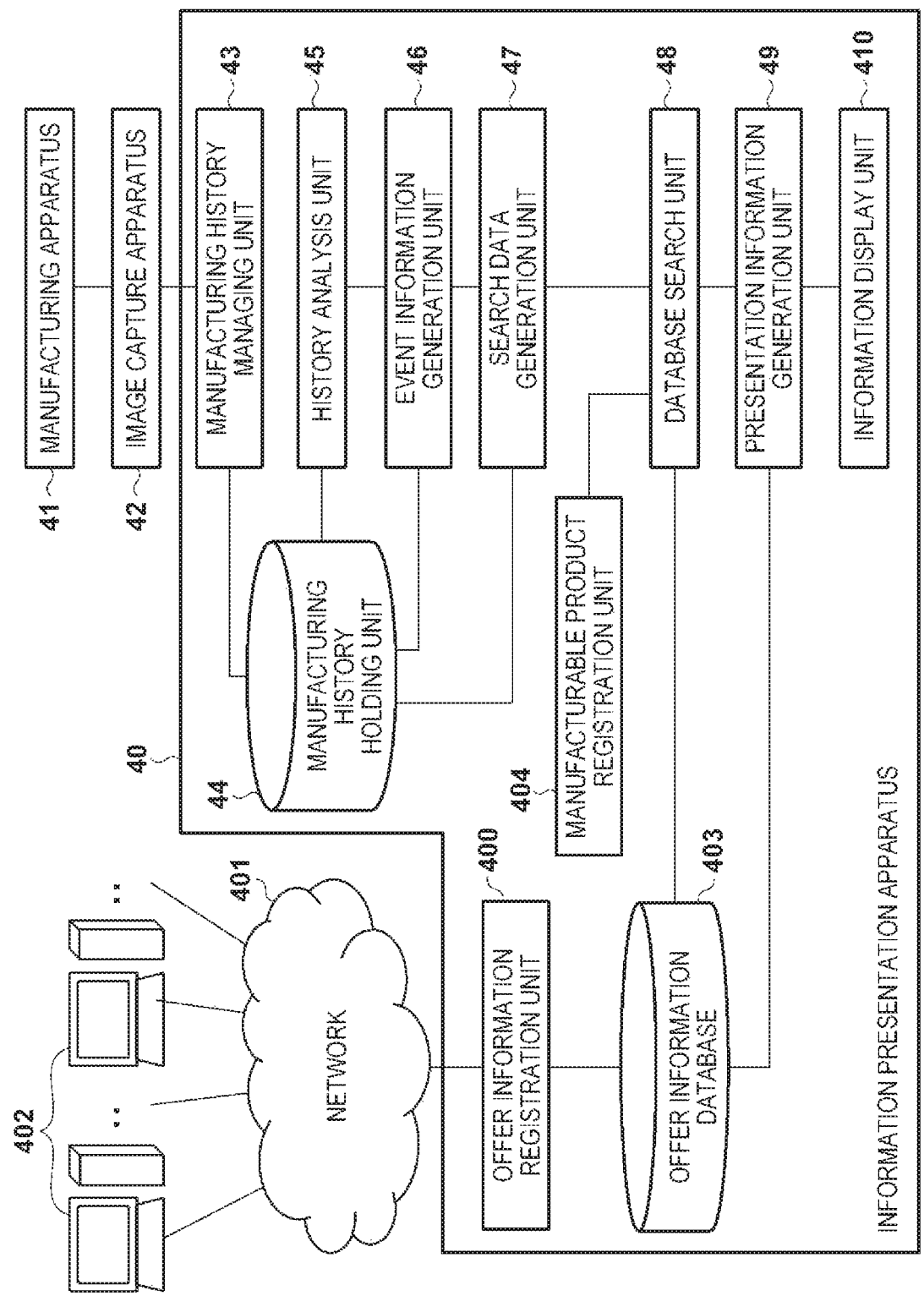

[Fig. 5]
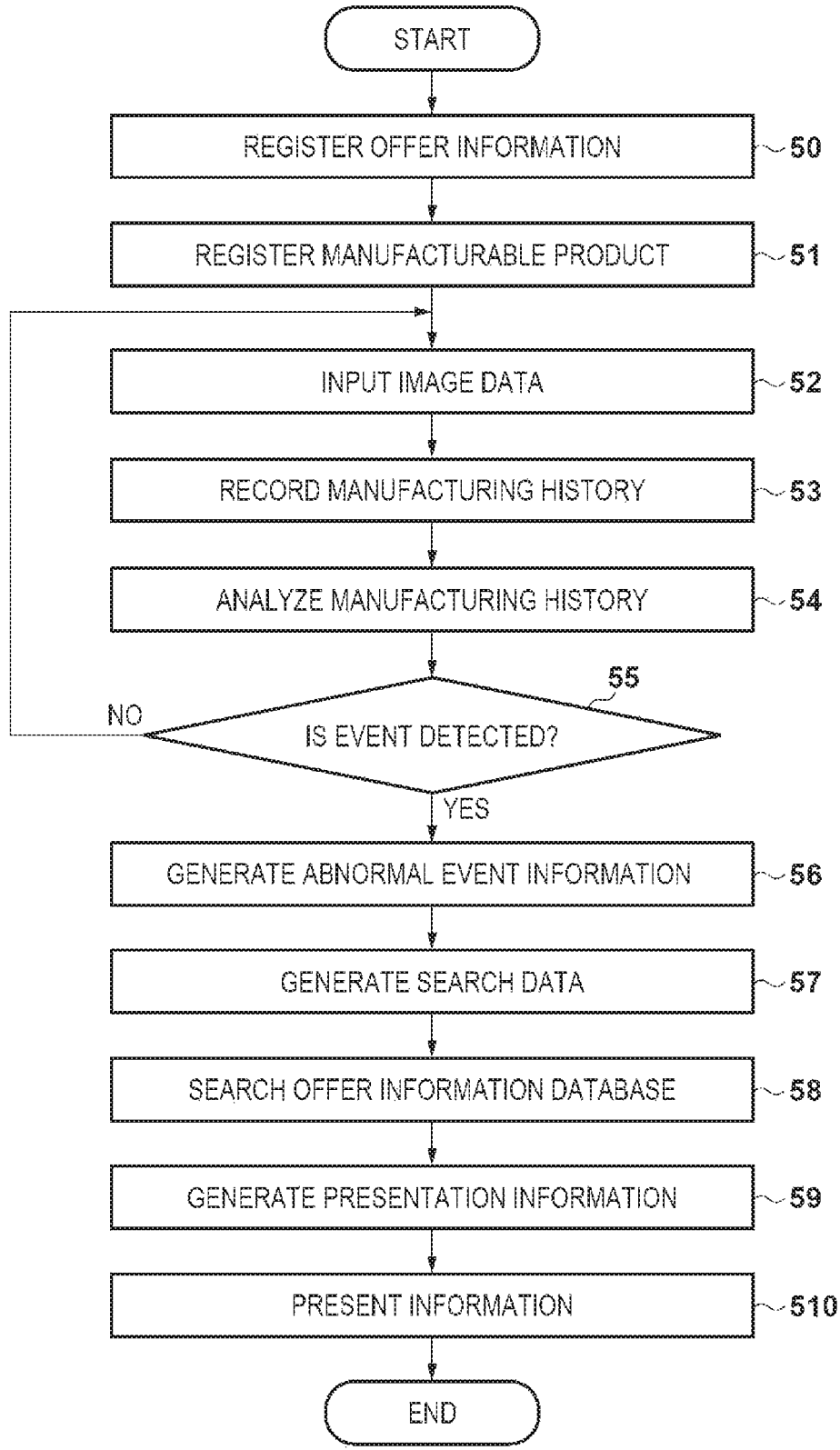

[Fig. 6]
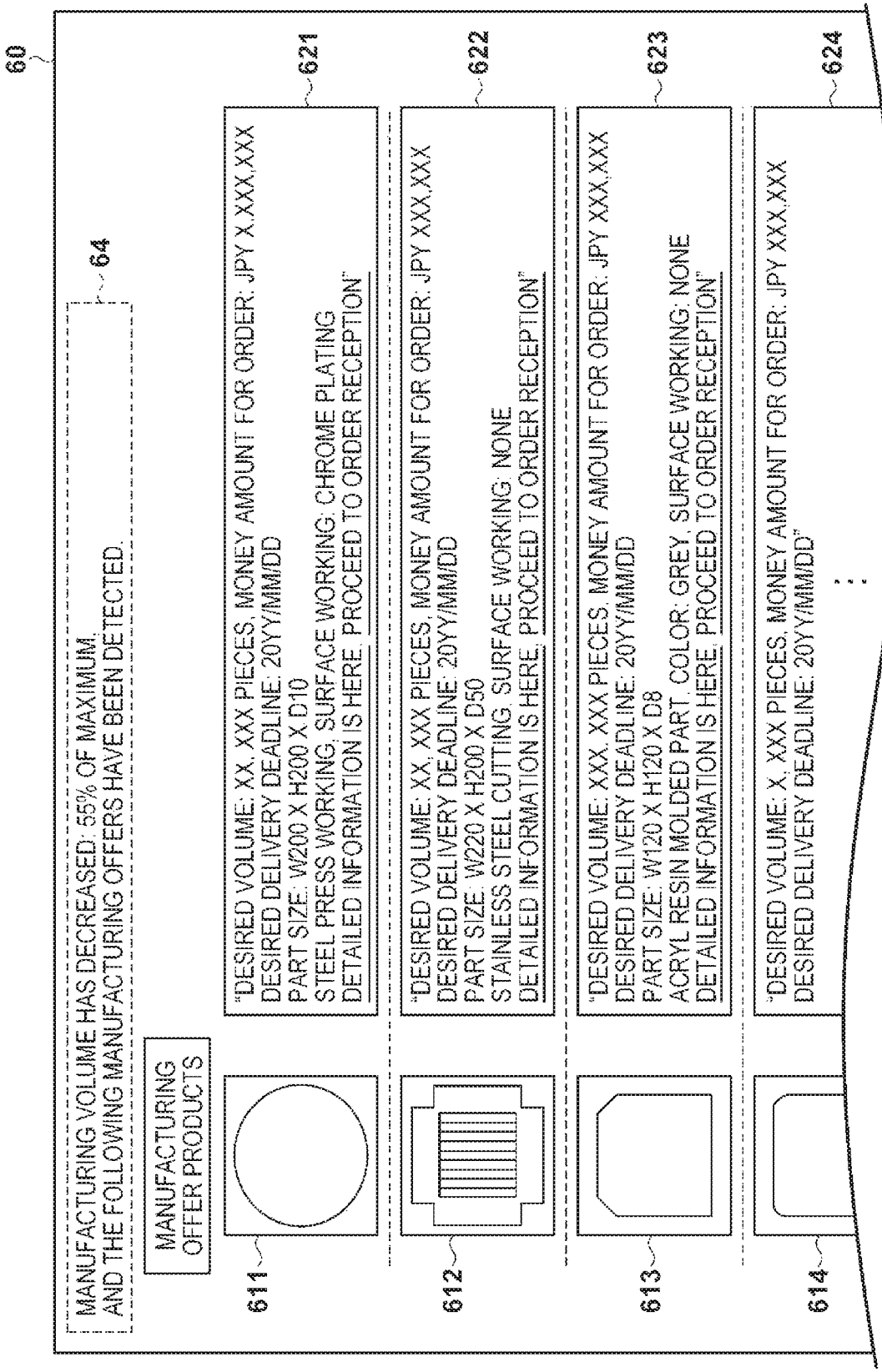

[Fig. 7]
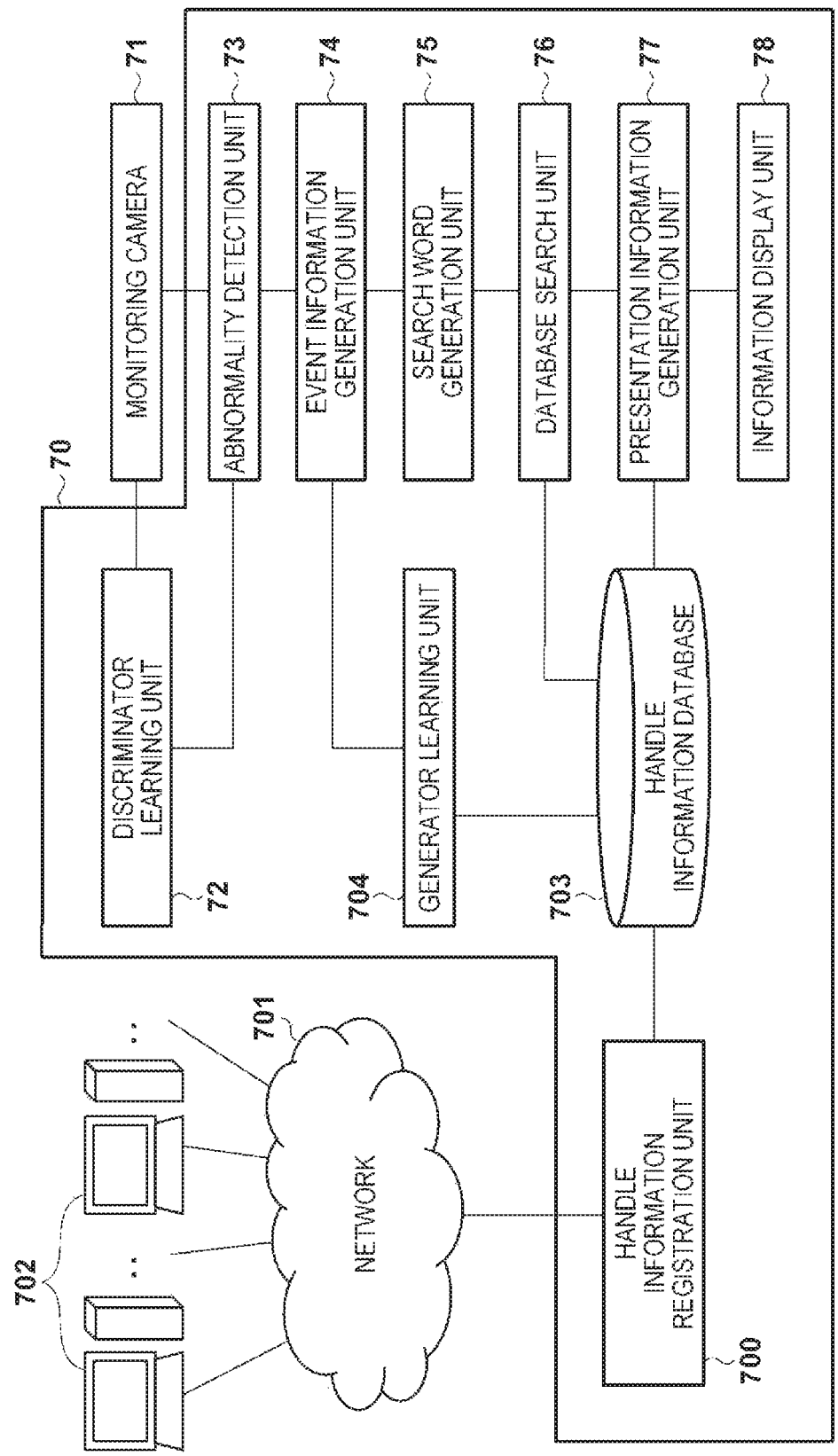

[Fig. 8]
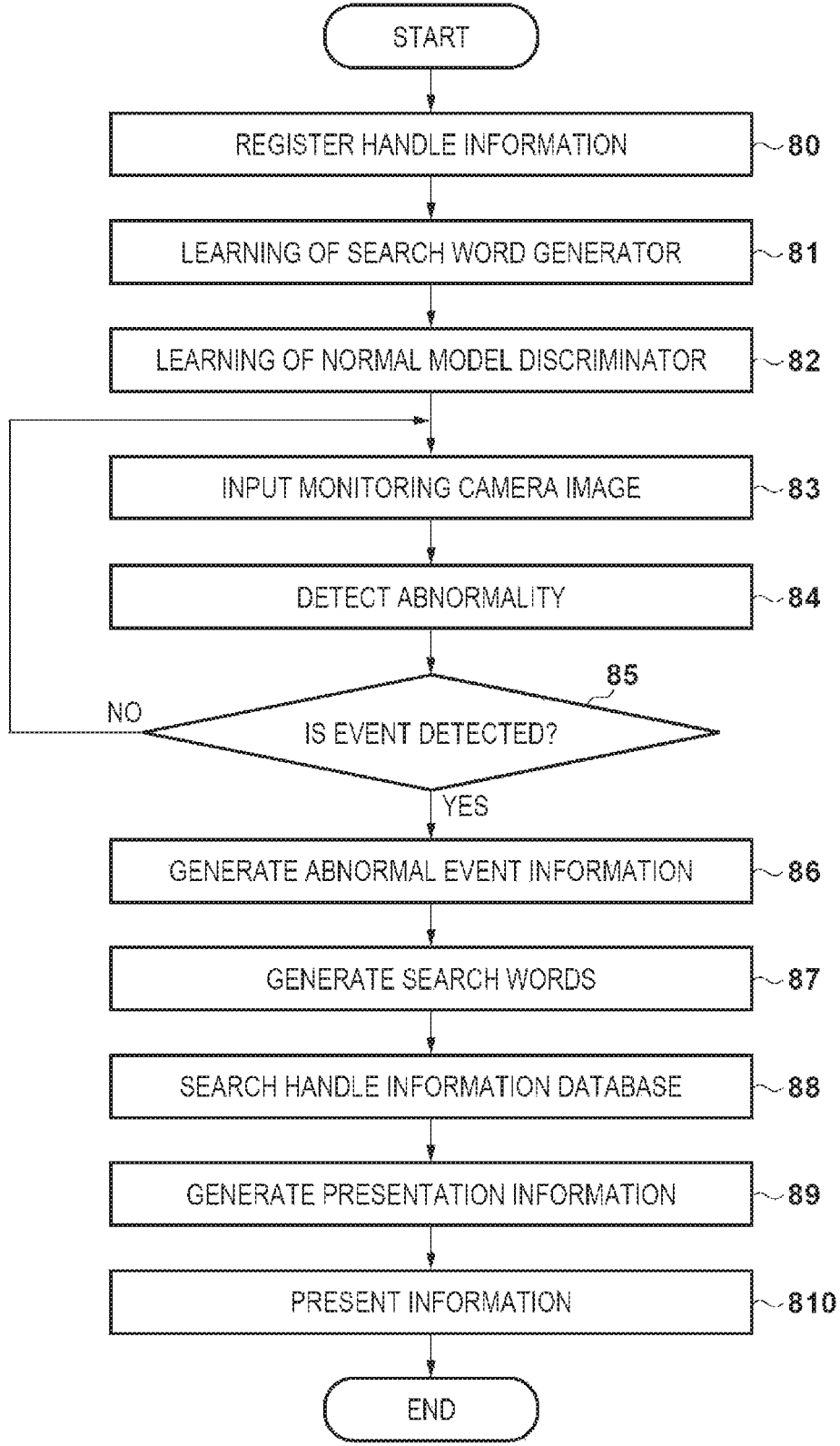

[Fig. 9]

[Fig. 10]
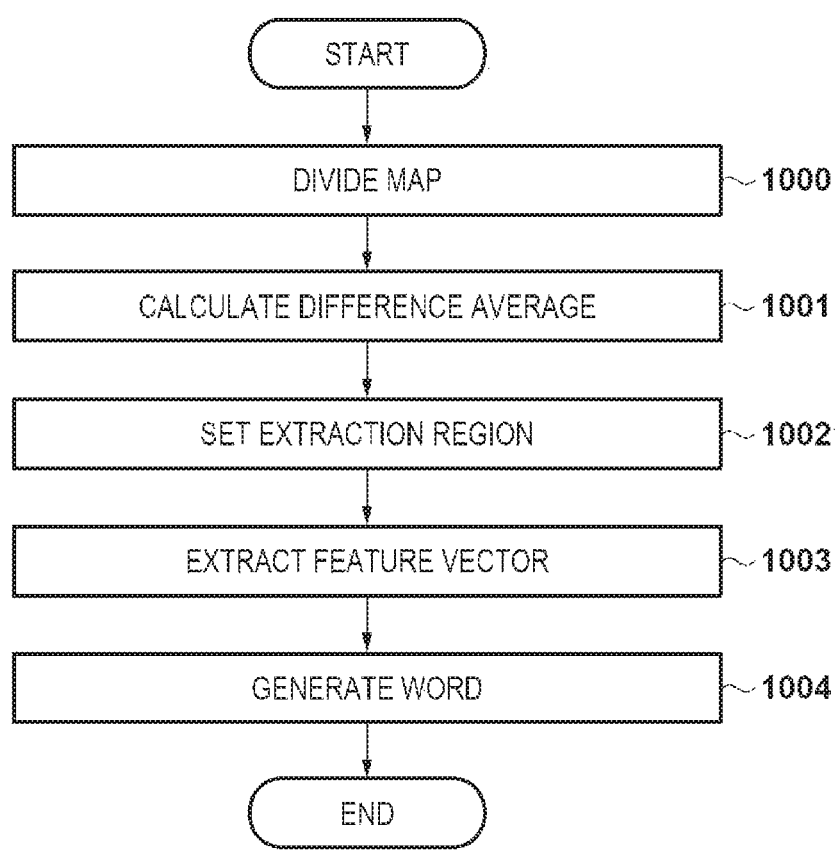

[Fig. 11]
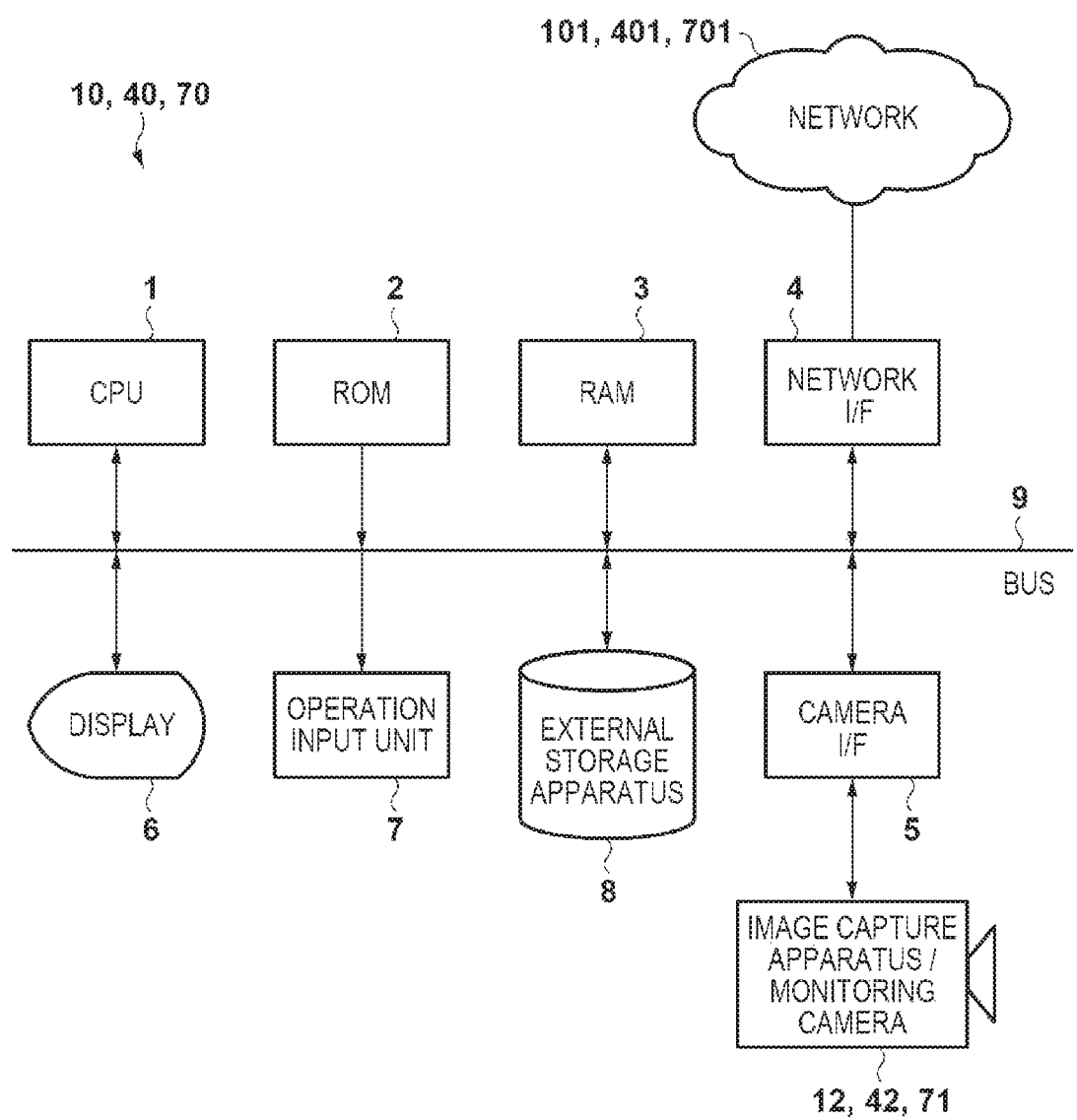

INFORMATION PRESENTATION METHOD AND APPARATUS

TECHNICAL FIELD

The present invention relates to an information presentation apparatus and an information presentation method for presenting information for handling an event that occurs in a monitoring target.

BACKGROUND ART

Various methods have been proposed as methods for handling an event such as an occurrence of an abnormality in a monitoring target. For example, Japanese Patent Laid-Open No. 2009-283580 discloses a manufacturing management system that can detect at an early stage an abnormality caused by an event in a manufacturing process of a semiconductor apparatus. In this manufacturing system, by taking as a key an event such as fluctuation of an environment, generation of an irregular value in a setting change, maintenance or inspection step, and comparing results of steps before and after the event, an abnormality is detected early, and notification and process control are performed. Because of this, it is possible to suppress an influence by a problem that occurs to a minimum and also perform early cause ascertainment and handle the problem.

In addition, Japanese Patent Laid-Open No. 2003-195925 discloses a manufacturing operation support system for extracting handle information from a history of past corresponding processing in accordance with a request from a user of a manufacturing apparatus when trouble has occurred in the manufacturing apparatus. In this manufacturing operation support system, a database that associates handle information relating to manufacturing apparatuses that is generated at various locations with apparatus information is constructed. In the manufacturing operation support system, the handle information is extracted, based on a request from a user, by searching the database in accordance with a type of the request and information of the apparatus that the user has.

However, in the manufacturing management system of Japanese Patent Laid-Open No. 2009-283580, notification of the occurrence of a problem and what an event that is highly probable to have been the cause thereof is possible, but it not possible to present a detailed response method for the problem that has occurred. In addition, in the manufacturing operation support system of Japanese Patent Laid-Open No. 2003-195925, although, if a similar case occurred in the past, a handling method performed at that time is presented, there was a need for a user to explicitly perform a request. In other words, if an event such as some kind of a problem has occurred in an apparatus, for example, there was been a need for a user to discover that event, identify details, and make a request.

SUMMARY OF INVENTION

By virtue of an embodiment of the present invention, an information presentation method and apparatus capable of automatically presenting, when an event such as an abnormality in a monitoring target has occurred, information having a high possibility of enabling handling of the event is provided.

According to one aspect of the present invention, there is provided an information presentation apparatus, comprising: obtainment means for obtaining monitoring information indicating a state of a monitoring target, and accumulating the monitoring information in a storage unit; detection means for detecting, based on the monitoring information accumulated in the storage unit, the occurrence of an information presentation trigger event; first generation means for generating, based on the monitoring information accumulated in the storage unit, search data for searching relevant information related to the event detected by the detection means; search means for searching the relevant information by using the search data generated by the first generation means; and second generation means for generating presentation information for presenting the relevant information found by the search by the search means.

Also, according to another aspect of the present invention, there is provided an information presentation method, comprising: an obtainment step of obtaining monitoring information indicating a state of a monitoring target, and accumulating the monitoring information in a storage unit; a detection step of detecting, based on the monitoring information accumulated in the storage unit, the occurrence of an information presentation trigger event; a first generation step of generating, based on the monitoring information accumulated in the storage unit, search data for searching relevant information related to the event detected by the detection step; a search step of searching the relevant information by using the search data generated by the first generation step; and a second generation step of generating presentation information for presenting the relevant information found by the search by the search step.

Further features of the present invention will become apparent from the following description of exemplary embodiments (with reference to the attached drawings).

BRIEF DESCRIPTION OF DRAWINGS

FIG. 1 is a functional block diagram for implementing an information presentation method in a first embodiment.

FIG. 2 is a flowchart for illustrating the information presentation method in the first embodiment.

FIG. 3 is a view illustrating an example of presentation information in the first embodiment.

FIG. 4 is a processing block diagram of an information presentation method in a second embodiment.

FIG. 5 is a flowchart for illustrating an information presentation method in the second embodiment.

FIG. 6 is a view illustrating an example of presentation information in the second embodiment.

FIG. 7 is a processing block diagram of an information presentation method in a third embodiment.

FIG. 8 is a flowchart for illustrating the information presentation method in the third embodiment.

FIG. 9 is a view illustrating an example of presentation information in the third embodiment.

FIG. 10 is a flowchart of search word generation processing in the third embodiment.

FIG. 11 is a block diagram illustrating an example of a hardware configuration of the information presentation apparatus.

DESCRIPTION OF EMBODIMENTS

Embodiments of the present invention are described below while referring to the attached drawings.

First Embodiment

In the first embodiment, description is given of an information presentation apparatus and method comprising:

as monitoring information, accumulating in a storage unit a history of defect determination results corresponding to a manufactured product manufactured by a manufacturing apparatus that is a monitoring target;

detecting, based on the monitoring information (history of defect determination results) accumulated in the storage unit, the occurrence (change of a manufacturing state) of an information presentation trigger event; and presenting relevant information corresponding to the event.

FIG. 1 illustrates a processing block diagram of an information presentation method of the first embodiment. In FIG. 1, an information presentation apparatus 10, based on an image obtained by an image capture apparatus 12 capturing a part manufactured by a manufacturing apparatus 11, detects an occurrence of an event for which information presentation should be performed, and presenting information such as a method for resolving a problem relating to the detected event. In addition the information presentation apparatus 10 is connected to a network 101, obtains handle information (described later) from an information processing apparatus 102 or a server 103 on the network 101, and constructs a handle information database 104.

The manufacturing apparatus 11 is an apparatus for manufacturing a product or a part, and for example is an apparatus for performing assembly of an electronic device, forming of parts, or the like. As the manufacturing apparatus 11, configuration may be taken to have something that manufactures any kind of thing, but in the present embodiment, description is given with a manufacturing apparatus for a plastic molded part in accordance with plastic injection molding, as an example. In plastic injection molding, molding is performed by steps of melting plastic pellets in a heating cylinder, injecting melted plastic into a metallic mold, and retrieving the plastic from the mold after cooling. Plastic molded parts after molding are arranged by a part feeder or the like, and one by one the outer appearance of each is captured by the image capture apparatus 12. An image of a captured outer appearance of a part is transmitted to the information presentation apparatus 10.

FIG. 11 is a block diagram illustrating an example of a hardware configuration of the information presentation apparatus 10 illustrated in FIG. 1. In FIG. 11, a CPU 1 realizes processing by each functional unit illustrated in FIG. 1 by executing a program stored in a ROM 2 or a RAM 3. The ROM 2 is a read-only memory, and the RAM 3 is a memory for which reading and writing are possible at any time. The ROM 2 stores, for example, a boot program that the CPU 1 executes at a time of activation of the information presentation apparatus 10. The RAM 3 functions as a main memory, and various programs stored in an external storage apparatus 8 are loaded into the RAM 3 as necessary, and executed by the CPU 1. A network interface 4 is connected to the network 101 and performs communication with an apparatus on the network 101. A camera interface 5 is connected to the image capture apparatus 12. For the information presentation apparatus 10, an image captured by the image capture apparatus 12 is input via the camera interface 5. A display 6 is a liquid crystal or the like display device, and performs various displays under the control of the CPU 1. An operation input unit 7 includes a keyboard, a pointing device, a touch panel, or the like, and provides a signal in accordance with a user operation to the CPU 1. The external storage apparatus 8 is a bulk storage unit that uses a hard disk for example, and can stored the later-described handle information database 104 or the like. A bus 9 is communicably connected to each of the above described units.

FIG. 2 is a flowchart for illustrating processing of an information presentation method by the information presentation apparatus 10 of the first embodiment. Below, FIG. 1 and FIG. 2 are used to give a description regarding an example of the information presentation method according to the first embodiment. Note that, although each functional unit of the information presentation apparatus 10 illustrated in FIG. 1 is realized by the CPU 1 executing a program stored in the ROM 2 or the RAM 3, all or some of the functional units illustrated in FIG. 1 may be configured by dedicated hardware.

Firstly, in step 20, a handle information registration unit 100 receives via the network 101 a large number of pieces of handle information from a plurality of the information processing apparatus 102 or a plurality of the server 103, collects them, and registers them in the handle information database 104. The plurality of the information processing apparatus 102 are, for example, information processing apparatuses such as PCs possessed by a plurality of third parties for providing solutions relating to manufacturing techniques, and stored solution information is transmitted via the network 101 to the handle information registration unit 100 as handle information. The handle information is information where multimedia data corresponding to a phenomenon to be resolved (an image or the like) and a resolution method therefor are made to be a set. Specifically, this is, for example, information in which an image (multimedia data) of a product in which a failure has occurred, and information of a cause of an occurrence thereof and for resolving a problem (the resolution method) are a set. As a more specific example, for example, this is information in which a phenomenon to be resolved: an image of a partially cloudy defect in nickel plating;

information for resolution: as a cause of the defect, information that there is the possibility of a mixing deficiency in a plating tank (occurrence cause), and information relating to an efficient mixer for resolving the mixing deficiency (the resolution method)

is made to be a set.

The multimedia data included in the handle information is data that indicates some kind of phenomenon as described above, but configuration may be taken such that rather than just data regarding the phenomenon itself pairing with data (reference data) for a case where the phenomenon does not occur is performed. For example, in the case of the aforementioned example of nickel plating, an image for a defect-free case and an image for where a defect has occurred are paired as reference data. In such a case, configuration is taken to attach a tag for indicating which image is the reference data. With such a configuration, it is possible to clarify a phenomenon taken as a target, by comparison with the reference.

The handle information registration unit 100 receives a large number of pieces of handle information, in which the phenomenon to be resolved and information for resolution are a set, from one or a plurality of the information processing apparatus 102, and registers it in the handle information database 104. In addition to the handle information received from the information processing apparatus 102, the handle information registration unit 100 may collect, as handle information, information published as a Web page or the like and existing on a plurality of the server 103. Specifically, for example, a common Web search engine is used to perform a search of Web pages by association keywords such as "defect" and "manufacturing process improvement", and, based on obtained results of the search, information is collected from the server 103 and registered in the handle information database 104. An association keyword used in the search may be something predetermined, or configuration may be taken to use a word in the handle information received from the information processing apparatus 102 as an association keyword. By such processing, a plurality of pieces of handle information is registered in the handle information database 104. Note that the handle information database 104 may be configured in the external storage apparatus 8, for example.

Note, in this embodiment, an image is used as multimedia data of handle information, but the multimedia data of the handle information of the present invention is not limited to this, and for example may be configured by audio, video, time-series data of a sensor such as a vibrometer, or the like. Specifically, something such as audio data of a strange noise at a time of apparatus operation may be raised, for example. In this manner, if it is data related to some kind of event, it may be any type of data. In addition, collection and registration to the handle information database 104 of handle information by the handle information registration unit 100 is not limited to a time of execution of step 20, and is assumed to be executed periodically or dynamically at an appropriate timing.

Next, in step 21, a defect determination unit 13 inputs as inspection image data an image of an outer appearance of a part (in the present embodiment, a plastic molded part) manufactured by the manufacturing apparatus 11 that is captured by the image capture apparatus 12.

In step 22, the defect determination unit 13 performs defect determination processing regarding the inspection image data (the image of outer appearance of the part captured by the image capture apparatus 12) input in step 21. In the defect determination processing, the defect determination unit 13 determines whether a defect is present in the part from the inspection image data, and, if a defect is present, determines what kind of defect is present from among predefined defect types. In the defect determination processing of the present embodiment, the defect determination unit 13 first extracts from the received appearance image various features such as an average or distribution of pixel values, a maximum value of a high-frequency component, or the like. The defect determination unit 13 uses a plurality of extracted feature amounts to determine whether a defect is present, by using a two-class classifier. The two-class classifier has learned in advance so that it can separate a plurality of pieces of data in which a defect is not present from a plurality of pieces of data in which a defect is present. As a two-class classifier, it is possible to apply various classifiers such as logistic regression or AdaBoost, but in the present embodiment a Support Vector Machine (SVM) is used.

Subsequently, in relation to an image for which a defect is determined to be present, the defect determination unit 13 uses a feature previously extracted to determine what type of defect is present by using a multi-class classifier. A multi-class classifier learns in advance by using a plurality of pieces of data in which defects are present, and, for each piece of data, data respectively added showing which defect out of predefined defect types each defect is. As such a multi-class classifier, it is possible to apply various classifiers, such a decision tree or a k-nearest neighbors algorithm. In the present embodiment, a plurality of one-vs.-rest type SVMs are used, and if an output of an SVM corresponding to a respective defect type exceeds a predetermined threshold, it is determined that the defect type is present. A one-vs.-rest type is a classifier for classifying into one class and other classes. Note that the defect determination processing is not limited to the above processing, and may be any type of processing if it can determine whether something has a defect and determine the defect type. For example, the surface defect determination method disclosed in Japanese Patent Laid-Open No. 2003-344300 may be applied.

A determination result obtained by the defect determination processing is transmitted to a determination history holding unit 14 together with the input inspection image data, and is held as a determination history. The determination history holding unit 14 is a storage unit for accumulating determination histories (inspection image data and determination result of a defect) as monitoring information. In addition, similarly to a typical visual inspection system, a part for which a defect is determined to not be present is conveyed downstream of the manufacturing process, and a part for which a defect is determined to be present is stocked in a defect product stocker or the like.

Next, in step 23, a history analysis unit 15 analyzes the accumulated history information, and if it determines that an abnormal state has occurred in the monitoring target, it determines that a trigger event has occurred. For example, in the present embodiment, the history analysis unit 15, by analyzing determination history recorded in the determination history holding unit 14, detects the occurrence of an information presentation trigger event (an abnormal state), such as occurrence frequency of a (certain type of) defect having increased in comparison to the past. In the present embodiment, detection of a trigger event is performed by comparing an inspection result history for a recent 100 times (a recent history) with an inspection result history prior to that (a past history). Specifically, in the present embodiment, firstly, based on the past history, an occurrence probability $p_n$ for a defect in a manufactured product, and occurrence probabilities $p_{n1}, p_{n2}, \ldots, p_{nk}$ for respective defect types are obtained. A number of occurrences $m_n$ of defects in the recent history and the number of occurrences in $m_{n1}, m_{n2}, \ldots, m_{nk}$ for respective defect types are counted to obtain the occurrences of the defects, and an upper cumulative probability $P_{un}$ as well as $P_{un1}, P_{un2}, \ldots, P_{unk}$ of a binomial distribution relating to occurrence of each of the defects. The upper cumulative probability $P_u$ of the binomial distribution can be obtained by the following equation in a case of letting an occurrence probability be p, a number of trials be N (in the present embodiment N=100), and a number of occurrences be m, $$P_u = 1 - \sum_{n=0}^{m-1} \frac{N!}{(N-n)!n!} p^n (1-p)^{N-n} \qquad \text{[Math. 1]}$$

In the present embodiment, if an obtained upper cumulative probability $P_u$ is less than or equal to a predetermined threshold (for example 5%), it is determined that an information presentation trigger event (an abnormal event) has occurred. For example, assuming that a defect occurrence probability $p_n$ that is obtained based on the past history is 5%, if a defect occurred 9 times in the recent history of 100 times the upper cumulative probability is 63%, and if a defect occurred 10 times it is 2.8%. Accordingly, if the threshold is 5% and if a defect has occurred 10 or more times in the recent 100 times, the history analysis unit 15 determines that the number of occurrences of defects is increasing in comparison to the past, and detects this as an information presentation trigger event. As described above, in the present embodiment, although an information presentation trigger event is detected based on determination history of defects of a manufactured product, the present invention is not limited to this. For example, configuration may be taken to, for example, detect an event based on a difference between a recent distribution and a conventional distribution of feature amounts extracted from an image, and other methods may be used.

If an information presentation trigger event is not detected by analysis of the determination history in step 23, the processing returns to step 21 from step 24 and the above-described processing is repeated for the inspection image data inputted next. Meanwhile, if an information presentation trigger event is detected, the processing proceeds to step 25 from step 24.

In step 25, an event information generation unit 16 generates information (event information) for what kind of event the trigger event that is detected in step S23 is. As described above in relation to the processing of the history analysis unit 15, in the present embodiment, broadly dividing there are the following two varieties of events. Specifically, an event in which a defect occurrence frequency has increased (the aforementioned $P_{un}$ is less than or equal to a predetermined threshold), and an event in which an occurrence frequency of a type of defect has increased (one of the aforementioned $P_{un1}, P_{un2}, \ldots, P_{unk}$ is less than or equal to a predetermined threshold). Event information in the present embodiment is information indicating whether a detected event is something for which the occurrence frequency of defects has increased overall, or something for which the occurrence frequency of a specific defect has increased. Firstly, the event information generation unit 16 selects a lowest upper cumulative probability from upper cumulative probabilities corresponding to respective defect types, and determines whether it is less than or equal to the aforementioned predetermined threshold. Here, if the lowest upper cumulative probability is less than or equal to the threshold, the event information generation unit 16 generates event information indicating that an occurrence frequency for the defect corresponding to the upper cumulative probability has increased. Meanwhile, if the lowest upper cumulative probability is greater than or equal to the threshold, the event information generation unit 16 generates event information indicating that an overall occurrence frequency for defects has increased. The generated event information is transmitted to a search data generation unit 17.

In step 26, the search data generation unit 17 generates search data from data related to the event, based on the event information received from the event information generation unit 16. In the present embodiment, the search data generation unit 17 generates the search data by, in accordance with the event information, selecting image data held by the determination history holding unit 14 and extracting a plurality of feature amounts from each image. Specifically, if received event information is event information stating that the overall occurrence frequency of defects has increased, an image that captures a part for which a defect is determined to be present in the recent history of 100 times is used as data that relates to the event. In addition, in the case of event information indicating that the occurrence frequency of a certain type of defect has increased, an image that captures a part for which that type of defect is determined to be present in the recent history of 100 times is used as data that relates to the event. With such a configuration, by, based on the event information, selecting data that is a source of generating search data, the possibility that search data that better corresponds to the event that has occurred can be generated increases. In the present embodiment, based on each piece of data relating to the event—in other words each image for which a defect is determined to be present, the search data generation unit 17 generates the following three types of search data from each image.

[First type] As search data, setting vector data that orders a plurality of predetermined feature amounts extracted from an image for which a defect is determined to be present. As a feature amounts extracted here, in the present embodiment, something that is the same as the plurality of feature amounts extracted by the defect determination unit 13 is used. In other words, something similar to the feature amounts used in determining whether a defect is present is used. In the present embodiment, in this way something the same as the feature amounts used by the defect determination unit 13 is used, but configuration may be taken to use some of them or add other feature amounts. In addition, configuration may be taken so as to crop a defect position in the image from the image, and extract feature amounts from the cropped image.

[Second type] As search data, setting a difference between a vector of the first type and a mean vector obtained by extracting feature amounts similar to the first type from each of a plurality of images for which a defect is determined to not exist in the past history (before the recent 100 times). In the present embodiment, a predetermined number (about 100) of images are sampled from a plurality of images in the past history for which a defect is determined to not be present, and a mean vector of feature amounts extracted from each is used. Of course, configuration may be taken to obtain a mean vector by extracting feature amounts from all images in the past history for which a defect is determined to not exist.

[Third type] As search data, setting vector data that orders a plurality of predetermined feature amounts extracted from a difference image generated from an image for which a defect is determined to be present and a recent image for which a defect was determined to not be present previously. Here, similarly to the first type, something similar to the feature amounts used by the defect determination unit 13 is used as the feature amounts to extract.

With such a configuration, the search data generation unit 17 generates a plurality of pieces of search data from data relating to the received event information. The search data generation unit 17 then transmits the generated search data to a database search unit 18. In the present embodiment, because three types of search data are generated for one image selected as relating to an event, if five images are selected from the determination history holding unit 14 for example, 5×3 types of search data is generated.

Next, in step 27, the database search unit 18 receives the search data transmitted from the search data generation unit 17, and uses the received search data to search for handle information in the handle information database 104. As mentioned previously, in the handle information database 104 are recorded a plurality of pieces of handle information that each form a set of multimedia data (an image or the like) corresponding to an event to be resolved and a resolution method therefor. The database search unit 18 generates vector data by extracting feature amounts, similar to those extracted by the search data generation unit 17, from the multimedia data (image data in the present embodiment) held by the plurality of handle information. The database search unit 18 performs a search of handle information by performing matching between the generated vector data and the received search data. In the present embodiment, matching is performed by simply obtaining a Euclidean distance between the search data (vector data) and the vector data extracted from each piece of handle information.

If handle information for which matching is performed does not have reference data—in other words does not have data for a case in which a phenomenon has not occurred, matching is only performed with search data of the first type. Meanwhile, if the handle information has reference data, feature amounts are also extracted from the reference data, difference data with vector data extracted previously is obtained, and matching is performed between the difference data and search data of the second type. In addition, a difference image between reference data and an image having handle information for which a phenomenon has occurred is generated, feature amounts are extracted from the difference image, and matching is performed between the feature amounts and search data of the third type.

By the above processing, for one piece of handle information a plurality of matching results are obtained (for example, if 5×3 types=15 pieces of search data are generated and an average of about 5 pieces of handle information are retrieved for one piece of search data, about 15×5=75 matching results are obtained). In the present embodiment, from the plurality of matching results for each piece of handle information, an average value of a predetermined number (for example about 5) of Euclidean distances having a high degree of matching—in other words high ranking by short Euclidean distances is obtained, and this is set as the matching result for the piece of handle information. The database search unit 18 obtains a matching result for each piece of handle information as described above, and transmits the results to a presentation information generation unit 19. Also, extraction of feature amounts from the multimedia data held by the handle information that is performed in the database search unit 18 may be performed beforehand, and what is already extracted may be referenced.

Next, in step 28, the presentation information generation unit 19 generates presentation information based on the matching result for each piece of received handle information that is from the handle information database 104. Specifically, in the present embodiment, from pieces of handle information for which a matching result was obtained, presentation information 30, as illustrated in FIG. 3, that orders a predetermined number (for example, about 10) of pieces of handle information in order from a high degree of matching is generated.

A region 311 of FIG. 3 is a region for displaying multimedia data (in the present embodiment, an image that illustrates a phenomenon) held by the handle information for which the degree of matching is highest. In addition, a region 321 is a region for displaying an image of a source for generating search data for which a degree of matching with the handle information was highest. In the present embodiment, one out of images for which a defect related to an event detected by the history analysis unit 15 is determined to be present is displayed. In the example illustrated in FIG. 3, a defect like cracking is present in a portion of a plastic molded part, an image thereof is displayed in the region 321, and an image held by the handle information corresponding to an example for which an outer appearance is similar to the defect is displayed in the region 311.

As mentioned previously, for example, in the history analysis unit 15, if an event indicating that the occurrence frequency of a type of defect has increased is detected, firstly a plurality of images of parts for which a defect of that type have been determined to exist are selected from the recent history. In the search data generation unit 17, search data is then generated from each of the plurality of images. Next, the database search unit 18 uses the generated search data to obtain a degree of matching with each piece of handle information. An image corresponding to search data for which a degree of matching with the handle information is highest is displayed in the region 321.

A region 331 is a region for displaying a summary related to the handle information in an order from a highest degree of matching, and, for example, displays a phenomenon that may be occurring, a cause and strategy for handling it, a link to information where detailed information relating to the strategy for handling is described, or the like. The region 311, the region 321, and the region 331 explained above are one set, and are regions in which information related to the handle information having the highest degree of matching is displayed. Similarly, information relating to handle information having the second highest degree of matching is displayed in a region 312, a region 322, and a region 332, . . . , and in this way the presentation information 30 that arranges information in an order from a highest degree of matching is generated. In addition, as with the information displayed in a region 34, configuration may be taken to include, in the presentation information, event information relating to an event detected in the history analysis unit 15.

Next, in step 29, an information display unit 110 displays the presentation information generated by the presentation information generation unit 19 in the display 6 which is an LCD or the like. The above is the processing of the information presentation method according to this embodiment.

By the above processing, it is possible to detect an information presentation trigger event based on a history of defect determination results with respect to a manufactured product that is manufactured by a manufacturing apparatus that is a monitoring target, and present information corresponding to the event. Because of this, an administrator of the manufacturing apparatus can notice an event that may be occurring in the manufacturing apparatus, and by referring to displayed information can also quickly implement a confirmation of the cause of the event and a counter-measure. In other words, conventionally if an administrator noticed the occurrence of some kind of event, there was a necessity to investigate a cause thereof, and implement a counter-measure based on that investigation. In contrast to this, by virtue of the information presentation method of the present embodiment, it is possible to eliminate effort for an administrator to investigate a cause and counter-measure by automatically detecting an event and automatically indicating information relating to the event. At this time, by simultaneously displaying information relating to the event that is currently occurring (in the present embodiment, an image) and information relating to handle information (in the present embodiment, an image and a summary) found by searching, the administrator can determine whether the information found by searching is appropriate. By confirming displayed details and viewing detailed information, it becomes possible to confirm a detailed counter-measure method, and make access to a manufacturer that is making an improvement suggestion.

Here, configuration may be taken so as to tally information on whether the administrator views the detailed information, and based on this update a matching method in the database search unit 18. Specifically, configuration may be taken so as, for example, to update a measuring reference (for example, change the weight of each feature amount) so that a distance between a feature vector extracted from the multimedia data of viewed information and search data having the highest match is calculated to be small. Thereby, in the search for handle information in the database search unit 18, a probability that it becomes possible to find more suitable information increases. In addition, to improve the precision of the search, configuration may be taken so as to refine handle information that becomes a target of a search that uses search data based on information other than the search data. For example, configuration may be taken so that a plurality of predetermined manufacturing step tags such as "injection molding" or "press working" are added in advance to the handle information, and, by the administrator specifying in advance a type of manufacturing step in the manufacturing apparatus, only related information becomes a retrieval target for the database search unit 18. In addition, configuration may be taken such that a geographical condition such as a location of a handle information provider is added in advance to the handle information, and, based on a geographical condition for where the manufacturing apparatus is installed, a retrieval target for the handle information is limited, priorities for handle information to display are changed, or the like for example.

Note, in this embodiment, description was given for an example of presenting an inspection result based on an outer appearance of a product and information based on an image for that time, but the present invention is not limited to that. For example, configuration may be taken so as to measure audio for a time of manufacturing or time-series information such as temperature in the apparatus and extract feature amounts from such data, generate search data, and use the search data to search for and present information. In such a case, something for which handle information is present in the multimedia data of the handle information becomes a search target, and, for example in the case of a search based on audio data, information for which audio is present as the multimedia data of the handle information becomes a search target. In addition, outputting audio by a speaker or the like can be given as information presentation of the audio data. In addition, regarding searching for information, in addition to something based on feature amounts, configuration may be taken to, for example, use an image annotation addition technique recited in "J. aeon, V. Lavrenko and R. Manmatha, "Automatic Image Annotation and Retrieval using Cross-Media Relevance Models", SIGIR '03, pp.119-126, 2003" to generate search terms and search the handle information in accordance with a full-text search or the like.

By the method described above, in a case of an event such as an abnormality occurring in a monitoring target, it becomes possible to present information having a high probability of achieving a countermeasure for the event.

Second Embodiment

In the first embodiment, illustration was given of an example of presenting relevant information (for example, image data corresponding to the defect and handle information that includes a cause or a resolution method for the defect) for an event that has occurred based on a history (for example, a history of defect determinations) of inspections of manufactured products. In the second embodiment, description is given of an example of a method that, based on a manufacturing history for a manufacturing apparatus that is a monitoring target, detects a decrease of a manufacturing amount by the apparatus as an information presentation trigger event, and presents relevant information that corresponds to the event. In the second embodiment, as an example of presentation of such relevant information, description is given of a configuration that detects a decrease of a manufacturing amount in a manufacturing apparatus, and presents a manufacturing offer from a third party that can be manufacturing by using the reserve capacity.

FIG. 4 illustrates a processing block diagram of an information presentation method of the second embodiment. In addition, FIG. 5 illustrates a processing flow diagram of an information presentation method of the second embodiment. Below, FIG. 4 and FIG. 5 are used to give a description regarding an example of the information presentation method according to the present embodiment. Note that the hardware configuration of an information presentation apparatus 40 is similar to that of the first embodiment (FIG. 11).

In step 50, an offer information registration unit 400 receives offer information from one or a plurality of an information processing apparatus 402 via a network 401, and registers it in an offer information database 403. The plurality of the information processing apparatus 402 are computers (hereinafter, PC) or the like possessed by third parties such as a plurality of assembly manufacturers that procure and assemble various parts, for example. The information processing apparatus 402 transmits, as offer information, information relating to a product for which a request for manufacturing is desired to the offer information registration unit 400 via the network 401. The offer information is a set of information such as multimedia data regarding a product that a third party such as an assembly manufacturer wishes to procure (such as an image of an outer appearance of a part), a material, a manufacturing method, a rough size, a number thereof that are desired to be procured, a money amount for an order, and a delivery deadline. The offer information registration unit 400 receives such offer information transmitted from the information processing apparatus 402 and performs processing to register it in the offer information database 403.

Next, in step 51, a manufacturable product registration unit 404 registers information relating to a product that can be manufactured in a manufacturing apparatus 41. In the present embodiment, an administrator of the manufacturing apparatus inputs by text input a product that can be manufactured (for example, inputs "plastic molded part" or the like), and also inputs in relation to a plurality of predetermined items such as the size of the product that can be manufactured. Information input here is used in a database search unit 48 that is described later. The processing of the above steps 50 and 51 may be performed dynamically or periodically separately from processing illustrated by steps 52 and onward. In addition, configuration may be taken such that registration of a manufacturable product of step 52 is not performed after being registered once as long as there is no change to the manufacturing apparatus 41.

Next, in step 52, a manufacturing history managing unit 43 inputs an image (image data) of an outer appearance of a product manufactured by the manufacturing apparatus 41 and captured by an image capture apparatus 42. The manufacturing apparatus 41 is an apparatus that manufactures products or parts, similarly to in the first embodiment (the manufacturing apparatus 11). Products manufactured in the manufacturing apparatus 41 are arranged similarly to in the first embodiment, and outer appearances thereof are captured by the image capture apparatus 42. The image of an outer appearance captured by the image capture apparatus 42 is transmitted to the manufacturing history managing unit 43.

In step 53, the manufacturing history managing unit 43 records in a manufacturing history holding unit 44 as a manufacturing history the image of the outer appearance of a manufactured product, and a manufacturing time. In the present embodiment, for simplicity the time at which the transmitted image was captured is set as the time at which the product was manufactured, and this is recorded in the manufacturing history holding unit 44 along with the image.

Next, in step 54, a history analysis unit 45, by analyzing the manufacturing history recorded in the manufacturing history holding unit 44, detects a decrease in manufacturing volume by the apparatus as an information presentation trigger event. For example, the history analysis unit 45 compares a manufacturing volume in a predetermined recent number of days (for example, three days) (recent manufacturing volume) with a maximum manufacturing volume in a previous same number of days. If the recent manufacturing volume is less than or equal to a predetermined proportion of the maximum manufacturing volume (for example 70% or fewer), the history analysis unit 45 determines that the manufacturing volume has decreased, and detects this as the information presentation trigger event.

In step 54, if the information presentation trigger event (decrease of manufacturing volume) is not detected, the processing returns from step 55 to step 52, and the above described processing (steps 53 and 54) is executed again. Meanwhile, if an information presentation trigger event is detected, the processing proceeds to step 56 from step 55.

Next, in step 56, an event information generation unit 46 performs processing to generate information (event information) on what degree of difference is between the detected event and a normal state. In the present embodiment, information (event information) on to what degree the manufacturing volume has decreased is generated based on the above-described "recent manufacturing volume" and "maximum manufacturing volume". The event information generated here is provided to a search data generation unit 47.

In step 57, based on the event information received from the event information generation unit 46 and an image of a product currently being manufactured that is recorded in the manufacturing history holding unit 44, the search data generation unit 47 generates search data for searching offer information relating to products that can be additionally manufactured. In the present embodiment, in addition to obtaining an approximate number of items that can be manufactured in one day based on the event information, a feature vector is generated by sampling a plurality of images (for example about 100) from images of products recorded in the manufacturing history holding unit 44, and extracting a plurality of predetermined feature amounts from each of these images. Note that configuration may be taken to use "an amount of time per day that can be devoted to manufacturing new products" in place of "an approximate number of items that can be manufactured in one day". The "plurality of feature vectors" extracted from the plurality of images and the "approximate number of items that can be manufactured in one day" are transmitted to the database search unit 48 as search data. As a feature amount to extract, it is possible to use a typical image feature amount such as an average value or a distribution of an image, but a feature amount that is converted into a numeric value, such as a product's color, degree of surface uniformity, or shape complexity may be used.

In step 58, the database search unit 48 uses the search data transmitted from the search data generation unit 47 and the information regarding manufacturable products that is registered in the manufacturable product registration unit 404 to search offer information in the offer information database 403. The offer information database 403 records, as mentioned previously, a plurality of pieces of offer information that is a set of information such as an image or the like regarding a product that a third party desires to procure, a material, a manufacturing method, and a number of items that are desired to be procured. The database search unit 48 firstly uses the information relating to the manufacturable products registered in the manufacturable product registration unit 404 to refine the offer information. For example, the offer information is refined based on a full-text search with respect to the offer information in accordance with information input by text on manufacturable products or synonymous words, or a determination of a degree of matching between a registered manufacturable size or the like and each piece of offer information (for example, whether the size is close). By such refining, it is possible to exclude offer information that clearly cannot be manufactured by the manufacturing apparatus 41 from candidates.

The search data generation unit 47 generates a feature vector by extracting feature amounts, which are similar to those extracted from the image of the product currently being manufactured (the above-described plurality of predetermined feature amounts in step 57), from an image related to a product held by the refined offer information. Matching is then performed with the plurality of feature vectors held by the search data transmitted from the search data generation unit 47, and an appearance similarity between the product of each piece of offer information and the product currently being manufactured is calculated. In the present embodiment, the similarity is simply calculated in accordance with an average of Euclidean distances between the feature vector generated from the image of each piece of offer information and each of the plurality of feature vectors held by the search data. By this processing, the similarity is calculated for each of the refined pieces of offer information.

Next, based on the similarity obtained for each of the refined pieces of offer information, the database search unit 48 estimates a rough amount of time for a setup change to switch from the product currently being manufactured to manufacture a product corresponding to the offer information. Although it is desirable to accurately estimate the amount of time required for a setup change, because estimation of an accurate amount of time is difficult, in the present embodiment a rough amount of time required for a setup change is estimated. For example, configuration may be taken to estimate which of 0 to 40 minutes, 40 minutes to 1.5 hours, and more than 1.5 hours in accordance with the obtained similarity. In the present embodiment, a rough amount of time is estimated by comparing the obtained similarity with a predetermined certain threshold. The threshold for the comparison and the rough amount of time determined accordingly may be changed in accordance with a manufacturing process being performed by the manufacturing apparatus. The manufacturing process being performed by the manufacturing apparatus may be estimated based on information of manufacturable products that is input by the manufacturable product registration unit 404 for example.

Finally, based on information such as the "approximate number of items that can be manufactured in one day" transmitted from the search data generation unit 47, the "rough amount of time for a setup change" obtained for each piece of offer information, and the "number of items that are desired to be procured" and "delivery deadline" or the like held by each piece of offer information, the database search unit 48 determines whether manufacturing is possible for each piece of offer information. The database search unit 48 then performs a sorting by the money amount for an order for offer information for which manufacturing is possible has been determined. By the above processing, it is possible to obtain from a plurality of pieces of offer information a result (a search result) in which offer information searched for based on whether manufacturing is possible has been sorted by the money amount for an order. The search result obtained here is transmitted to a presentation information generation unit 49.

In this way, in the present embodiment, refining of offer information based on the possibility of handling an offer and sorting of information based on a money amount for an order are performed, but there is no limitation to this. For example, if calculation is possible, another method may be applied, such as sorting information based on a profit amount. In addition, in the present embodiment, a possibility of handling an offer is determined based on information such as a shape, but configuration may be taken so as to consider a geographical condition or the like.

Next, in step 59, the presentation information generation unit 49 generates presentation information based on results of the search provided from the database search unit 48. Specifically, in the present embodiment, presentation information 60 as illustrated in FIG. 6 that arranges a predetermined number of pieces of offer information in an order that is sorted by the money amount for an order in the results of the search is generated.

A region 611 of FIG. 6 is a region for displaying multimedia data (in the present embodiment, for example an image of an outer appearance of a part) relating to offer information having the highest money amount for an order out of the refined offer information. In addition, a region 621 is a region for displaying a summary of the offer information, and displays a desired number of items, the money amount for an order, information on the processing and the like, and further displays a link to detailed information, a link to proceed to processing for order reception of the offer, and the like. The region 611 and the region 612 form one set, and are regions in which information regarding offer information having the highest money amount for an order is displayed. Similarly, information regarding offer information for the second highest money amount for an order is displayed in the region 612 and a region 622, . . . , and in this fashion the presentation information 60 in which the refined offer information is arranged in an order from highest money amount for an order is generated.

In step 510, an information display unit 410 displays the presentation information generated by a presentation information generation unit 59 on the display 6, similarly to in the first embodiment. The above is the processing of the information presentation method according to the second embodiment.

By the above processing, it is possible to detect a decrease in a production amount in a manufacturing apparatus that is a monitoring target as an information presentation trigger event, and present manufacturing offers from third parties that can be manufactured in accordance with reserve capacity of the manufacturing apparatus to handle the event. By such processing, an administrator of the manufacturing apparatus can easily confirm whether there is a manufacturing offer for which manufacturing is possible by making use of the reserve capacity of the manufacturing apparatus, by referring to displayed information. With such a configuration, the information presentation method of the present invention can also be applied in relation to presentation of information such as a production offer.

Third Embodiment

In the first and second embodiments description was given of examples that use history information that includes still images. In the third embodiment, description is given of an example of detecting the occurrence of an event that differs from a normal state based on a time-series change (change in a video) of monitoring information, as an information presentation trigger event. More specifically, in the third embodiment, description is given of an example of a method of detecting, based on a monitoring camera video that captures a manufacturing line that is a monitoring target, an event different to a normal state as an information presentation trigger event, and presenting information corresponding to the event.

FIG. 7 illustrates a processing block diagram of an information presentation method of the present embodiment. In addition, FIG. 8 illustrates a processing flow diagram of an information presentation method of the present embodiment. Below, FIG. 7 and FIG. 8 are used to give a description regarding an example of the information presentation method according to the present embodiment. Note that the hardware configuration of an information presentation apparatus 70 is similar to that of the first embodiment (FIG. 11).

In step 80, a handle information registration unit 700 receives a plurality of pieces of handle information from one or a plurality of an information processing apparatus 702 via a network 701, and registers it in a handle information database 703. In the present embodiment, similarly to the first embodiment, the plurality of the information processing apparatus 702 are PCs or the like possessed by a plurality of third parties that provide a solution in relation to manufacturing, and the information processing apparatus 702 transmits stored solution information as handle information to the handle information registration unit 700. Note that, in the first embodiment, image data (a still image) relating to a phenomenon is used as multimedia data of the handle information, but in the present embodiment video data relating to a phenomenon is used as the multimedia data of the handle information. Note, in regards to information that corresponds to a phenomenon in each piece of handle information, it is similar to that in the first embodiment. By the handle information registration unit 700, a large number of transmitted pieces of handle information is registered in the handle information database 703. Note that the processing of step 80 may be performed dynamically or periodically separately from processing illustrated by steps 83 and onward.

Next, in step 81, based on the plurality of pieces of handle information recorded in the handle information database 703, a generator learning unit 704 learns a search word generator for generating from the video data words to use as search words. Here, by setting the video data held by each piece of handle information as input video data for learning and word data present in the handle information that corresponds thereto as output word data for learning, the search word generator for generating a plurality of words from the video data is learned. Note, regarding generation of search words, any method may be used if it is a method that sets video data as an input and can generate a plurality of words having high relatedness to the video data, but in the present embodiment a video annotation addition technique recited in "S. L. Feng, R. Manmatha and V. Lavrenko, "Multiple Bernoulli Relevance Models for Image and Video Annotation", CVPR '04, pp. 1002-1009,Vol. 2, 2004" is used. The search word generator learned by the above processing of step 81 is transmitted to a search word generation unit 75 because it is used in processing in step 87 that is described later. Note, in this embodiment, although description is given of an example of case of learning a search word generator by this step (step 81), redoing the learning of the search word generator may be performed at a fixed interval in a case such as where handle information is additionally registered.

Next, in step 82, based on the video data of the manufacturing line captured by a monitoring camera 71, a discriminator learning unit 72 generates a normal model discriminator for determining whether the manufacturing line is in a normal state. Here video data obtained by capturing a state where no problem whatsoever has occurred (in other words, monitoring information for a normal time) using the monitoring camera 71 is set as the video data for learning, and a normal model discriminator that models this state is learned. Configuration may be taken such that whether the video data used in learning is of a state in which no problem whatsoever has occurred is, for example, confirmed by an administrator of the manufacturing line actually visually observing the video data of the monitoring camera. Here any method may be used if it is a method that can detect whether input video data is in a state of having deviated from normal, and in the present embodiment an abnormal action detection technique recited in "Hirotaka Hachiya and Masakazu Matsugu, "NSH: Normality Sensitive Hashing for Anomaly Detection", ICCVW '13, pp. 795-802, 2013" is used. The normal model discriminator learned in step 82 is transmitted to an abnormality detection unit 73 because it is used in abnormality detection processing in step 84 that is described later. Similarly to the learning of the search word generator, the execution of the learning of the normal model discriminator is also not limited to the timing indicated by step 82, and learning may be redone every fixed interval for example.

Next, in step 83, the abnormality detection unit 73 inputs the monitoring camera image (video data) from the monitoring camera 71. The monitoring camera 71 is, as mentioned previously, an image capture apparatus for capturing video data of a manufacturing line that is a monitoring target, and the captured video data is transmitted to the abnormality detection unit 73 at each fixed interval (for example about one minute).

In step 84, based on the video data transmitted from the monitoring camera 71, the abnormality detection unit 73 detects a state that has deviated from the normal state as an information presentation trigger event. Here, whether a state that has deviated from normal is occurring is detected by using the normal model discriminator transmitted from the discriminator learning unit 72 to perform processing with respect to the video data transmitted from the monitoring camera 71. In step 84, if an information presentation trigger event—in other words a state that has deviated from normal—is not detected, the processing returns to step 83 from step 85. Meanwhile, if an information presentation trigger event is detected in step 84, the processing proceeds to step 85 from step 86.

In step 86, an event information generation unit 74 generates information (event information) for what kind of difference the event detected in step 84 has in comparison to a normal state. In the present embodiment, information indicating which image region on an image of the video data for which an event is detected differs from a normal state is generated as event information. Specifically, for example, for each position (x, y) of video data for which an event is detected, an average $\mu'x,y$ and a standard deviation $\sigma'x,y$ for a pixel value are obtained. Next, similarly, for example, for each position (x, y) of video data of a normal state, an average $\mu x,y$ and a standard deviation $\sigma x,y$ for a pixel value are obtained. Using the following formula, a difference $d(x, y)$ is obtained for each position (x, y).

$$d(x, y) = \frac{1}{2} \left\{ \frac{\sigma_{x,y}^2}{\sigma_{x,y}'^2} + \log \frac{\sigma_{x,y}'^2}{\sigma_{x,y}^2} + \sigma_{x,y}'(\mu_{x,y} - \mu_{x,y}')^2 - 1 \right\} \quad \text{[Math. 2]}$$

A map that takes values for the difference $d(x, y)$ calculated by [Math. 2] as the value of respective positions (x, y) becomes the event information in the present embodiment. The event information generation unit 74 provides the search word generation unit 75 with the event information (map) generated as described above together with the video data in which the event was detected.

In step 87, the search word generation unit 75 generates a plurality of search words, based on the event information (map) received from the event information generation unit 74 and the video data in which the event was detected. Here, based on the received event information, a plurality of words are generated by extracting the image region in which there was a difference with a normal state from the video data, and inputting the search word generator transmitted from the generator learning unit 704.

In the present embodiment, detail of the processing of step 87 (the search word generation unit 75) is explained by using a flowchart of search word generation processing as illustrated in FIG. 10. In the present embodiment, as a method for generating words from the video data, the above described video annotation addition technique is used. In this method, the video data is divided into a plurality of rectangular regions, a feature vector is generated from each rectangular region, and generative probability of each word is obtained based on the feature vectors. The search word generation unit 75 uses the event information (the difference $d(x, y)$ map) received from the event information generation unit 74 to extract the feature vector from the region in which there is a difference, and uses that feature vector to generate words.

Firstly, in step 1000 the search word generation unit 75 divides the map received as event information that illustrates the difference into a plurality of rectangular regions. Here, for the size of a rectangular region, the same region size as when the search word generator was generated in the generator learning unit 704 as previously described is used. Next, in step 1001, the search word generation unit 75 calculates an average value of the map indicating the difference in each rectangular region obtained by the dividing. Next, in step 1002, the search word generation unit 75 sets a region for which the average value of the difference obtained for each rectangular region is greater than or equal to a predetermined threshold (for example, 0.7 or more) as a region for which to extract a feature vector. Here, if a region for which the average value of the difference is greater than or equal to the predetermined threshold is not present, one region for which the average value of the difference is highest is set as the region for which to extract the feature vector. With such a configuration, in the present embodiment, at least one rectangular region is set as a region for which to extract a feature vector. Note that method of setting a rectangular region for which to extract a feature vector is not limited to that described above. For example, configuration may be taken so as to select a predetermined number (for example, three or the like) of rectangular regions in an order from highest average value of the difference, and set these as regions for which to extract feature vectors.

Next, in step 1003, the search word generation unit 75 extracts a feature vector from each of the rectangular regions set in step 1002. The feature vectors extracted here are similar feature vectors to those extracted when the search word generator is generated in the generator learning unit 704. Specifically, for example, feature amounts such as an average value and distribution of a pixel are extracted, and the feature vector is generated by ordering the extracted feature amounts.

Finally, in step 1004, the search word generation unit 75 generates a plurality words by inputting at least one feature vector extracted in step 1003 to the search word generator generated by the generator learning unit 704. With such a configuration, because words are generated from portions have a large difference in comparison to the normal state, a possibility that words having a relation to the detected event can be generated increases. The search word generation unit 75 provides the generated plurality of words as search words to a database search unit 76.

Returning to FIG. 8, in step 88, the database search unit 76 uses the search words comprised of the plurality of words provided from the search word generation unit 75 to search the handle information in the handle information database 703. In the present embodiment, the search of the handle information is performed by performing a full-text search, in accordance with the transmitted search words, with respect to character string data present in information for handling each phenomenon that is held by the handle information in the handle information database 703. As a method for the full-text search, any method may be used if it is a method that can perform a ranking of the results of the search. In the present embodiment, the full-text search is performed by using a known Japanese language full-text search system (for example, Namazu). The database search unit 76 obtains a ranked result for each piece of the handle information in accordance with the full-text search processing that uses the search words, and provides the result to the presentation information generation unit 77.

Figure 9:
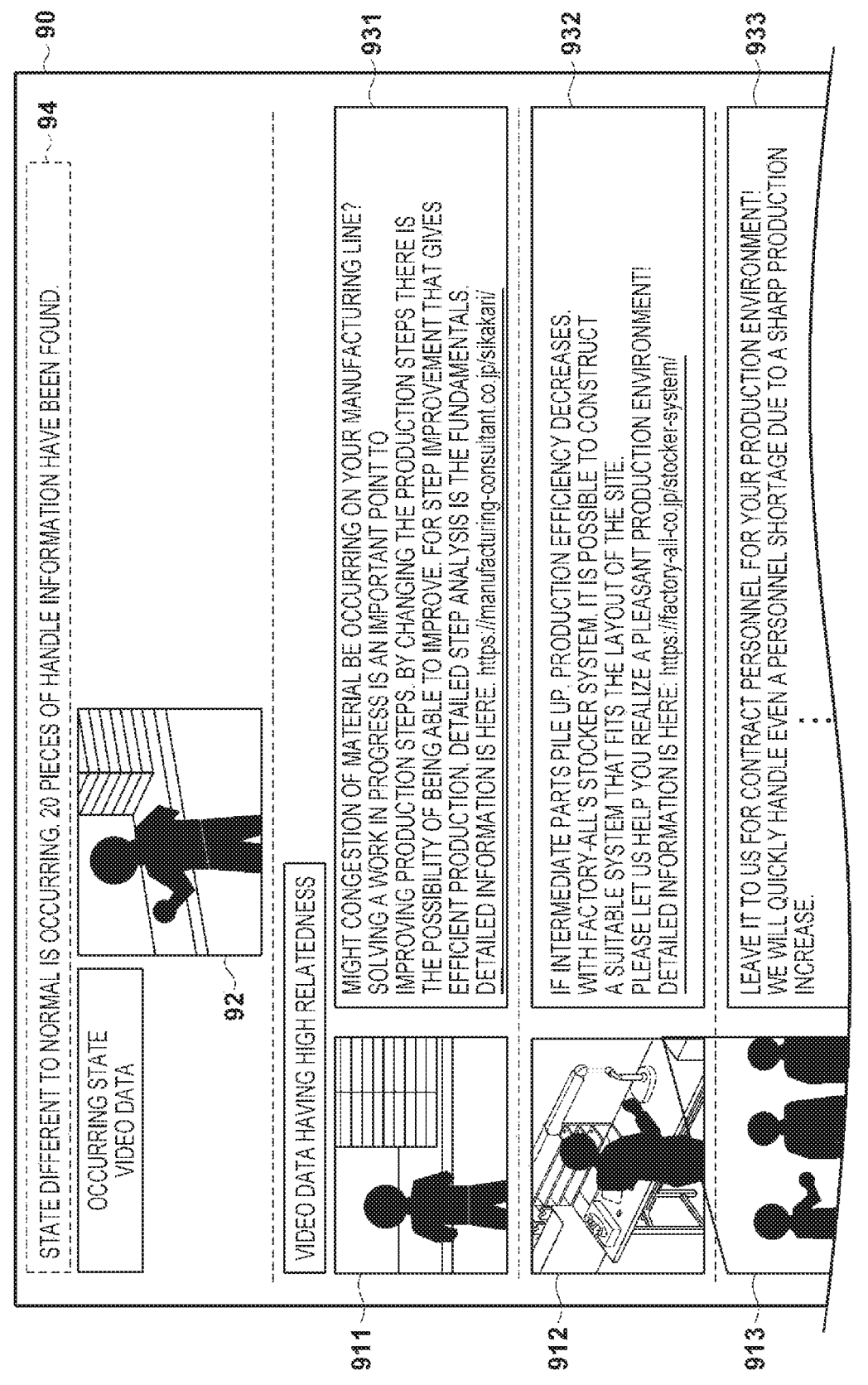

Next, in step 89, the presentation information generation unit 77 generates presentation information based on results transmitted from the database search unit 76. Specifically, in the present embodiment, presentation information 90 for performing a display as illustrated in FIG. 9 that orders a predetermined number of pieces of handle information in the order of the ranked result for each piece of the handle information is generated.

A region 92 of FIG. 9 is a region for displaying video data for when a state that deviates from normal is detected by the abnormality detection unit 73 (step 84). In addition a region 911 is a region for displaying multimedia data (video data in the present embodiment) held by the handle information having the highest rank in the result of the search process of the database search unit 76 (step 88). A region 931 is a region for displaying a summary related to the handle information, and an overview of the handle information, a link to detailed information, and the like are displayed. The region 911 and the region 931 form one set, and become regions in which information relating to the handle information having the highest rank in the results of the search is displayed. Below, similarly to other embodiments, a region 912 and a region 932 are for information related to the handle information having the second highest rank, . . . , and in this fashion the presentation information 90 that arranges information in an order from highest rank is generated. In addition, configuration may be taken such that information such as how many pieces of the handle information were found by searching is indicated in a region 94.

In step 810, an information display unit 78 displays the presentation information 90 generated by the presentation information generation unit 77 (step 89) on the display 6.

The above is the processing of the information presentation method according to the third embodiment.

By the above processing, it is possible to detect, based on a monitoring camera video obtained by capturing a manufacturing line that is a monitoring target, an event different to a normal state as an information presentation trigger event, and present information corresponding to the event. Because of this, an administrator of the manufacturing line can refer to the displayed information, and confirm which kind of event has occurred as well as information that may be able to handle the event. For example, as in the example illustrated in FIG. 9, it becomes possible to detect a state in which work in progress is increasing in a manufacturing line as an event that deviates from normal, and present, as information related to this, information related to an improvement suggestion for manufacturing steps or information relating to a system for stocking parts. In addition, for example, it is possible to detect an event referred to as a so-called unsafe incident, and be able to present handle information therefor. In this fashion, the information presentation method of the third embodiment can also be applied to a case of detecting, based on an image from a monitoring camera, an event different to normal that is not clearly defined in advance, and present information with the possibility of being able to handle the event.

Note that, in the embodiment described above, although description was given of an example of all of generating search data, using it, and searching for relevant information from a database, the present invention is not limited to this. For example, application can also be made to a case of inputting data generated from monitoring data into a back-end system such as a physical simulator or a statistical inference system to generate relevant information.

The information presentation apparatuses 10, 40 and 70 may be configured by a plurality of information processing apparatuses (computers). For example, in FIG. 1, the information presentation apparatus 40 may be configured by being divided into an apparatus that establishes the handle information database 104 (includes the handle information registration unit 100 and the handle information database 104), and an apparatus for performing from defect determination to information presentation.

As described above, by each of the aforementioned embodiments, it becomes possible to, if an event such as an abnormality has occurred in a monitoring target, search for and present relevant information having a high probability of being able to handle the event that occurred even if it is an unknown event, because search data for the search is generated based on monitoring information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-242645, filed Dec. 11, 2015 which is hereby incorporated by reference herein in its entirety.

The invention claimed is:

1. An information presentation apparatus, comprising:
one or more memories storing one or more programs; and
one or more processors which, by executing the one or more programs, function as:
 an obtainment unit configured to obtain monitoring information for specifying a state of a monitoring target, which is obtained by monitoring the monitoring target over time;
 an accumulating unit configured to cause a storage unit to accumulate the monitoring information obtained by the obtainment unit;
 a detection unit configured to detect, based on the monitoring information accumulated in the storage unit, an occurrence of a trigger event;
 a first generation unit configured to generate, based on the monitoring information accumulated in the storage unit, search data for searching relevant information related to the trigger event detected by the detection unit, wherein the relevant information includes an image corresponding to the trigger event, information that indicates a cause of the trigger event, and information that indicates a solution to a problem related to the trigger event;
 a search unit configured to search the relevant information by using the search data generated by the first generation unit; and
 a second generation unit configured to generate presentation information for presenting the relevant information searched by the search unit,
 wherein the detection unit determines that the trigger event has occurred upon determining that the occurrence of an abnormal state is detected based on a history of the monitoring information, and
 wherein the detection unit determines that the occurrence of the abnormal state is detected if a decrease of a manufacturing volume in the monitoring target exceeds a predetermined reference.

2. The apparatus according to claim 1, wherein
the detection unit determines that the occurrence of the abnormal state is detected based on a change of a probability that a manufactured product in the monitoring target is determined to have a defect.

3. The apparatus according to claim 1, wherein
the first generation unit extracts, based on the trigger event detected by the detection unit, monitoring information for generating the search data from the monitoring information accumulated by the accumulating unit.

4. The apparatus according to claim 1, wherein
the search unit refines the relevant information that is a target of the search that uses the search data based on information other than the search data.

5. The apparatus according to claim 1, wherein
the detection unit detects, as the information presentation trigger event, the occurrence of an event different to a normal state based on a time-series change of the monitoring information.

6. The apparatus according to claim 5, wherein the one or more processors further function as
a third generation unit configured to generate a normal model discriminator for determining whether the monitoring target is in a normal state based on monitoring information for a normal time,
wherein the detection unit uses the normal model discriminator to detect the occurrence of an event different to a normal state in the monitoring information.

7. The apparatus according to claim 1, wherein the one or more processors further function as
a registration unit configured to receive and register relevant information from an external apparatus,
wherein the search unit searches the relevant information registered by the registration unit.

8. The apparatus according to claim 7, wherein
the registration unit collects the relevant information from the external apparatus in accordance with a keyword related to the trigger event.

9. The apparatus according to claim 1, wherein
the first generation unit generates the search data by extracting a predetermined feature amount from the monitoring information accumulated in the storage unit, and
the search unit searches the relevant information based on matching between the search data and the predetermined feature amount extracted from the relevant information.

10. The apparatus according to claim 1, wherein
the first generation unit generates the search data by generating words based on the monitoring information in which the trigger event is detected.

11. The apparatus according to claim 10, wherein
the relevant information includes an image corresponding to the trigger event and character string data, and
the first generation unit
uses a plurality of pieces of the relevant information to learn a search word generator for generating at least one word from an image, and
uses the learned search word generator to generate at least one word from the monitoring information for which the trigger event is detected.

12. The apparatus according to claim 10, wherein
the search unit performs that search in accordance with a full-text search that uses the search data with respect to character string data held by the relevant information.

13. The apparatus according to claim 1, wherein
the second generation unit generates the presentation information so as to present the relevant information in an order from a highest degree of matching with the search data.

14. The apparatus according to claim 1, wherein
the second generation unit generates the presentation information to present an overview of the relevant information and a link related to details of the relevant information.

15. The apparatus according to claim 1, wherein
the second generation unit generates the presentation information to present the trigger event detected by the detection unit.

16. The apparatus according to claim 1, wherein
the monitoring target is a manufactured product manufactured by a manufacturing apparatus,
the accumulating unit accumulates the monitoring information including defect determination results corresponding to manufactured products, and
the detection unit detects the occurrence of the trigger event based on occurrence frequency of a defect in manufactured products.

17. An information presentation method, comprising:
obtaining monitoring information for specifying a state of a monitoring target, which is obtained by monitoring the monitoring target over time;
causing a storage unit to accumulate the obtained monitoring information;
detecting, based on the monitoring information accumulated in the storage unit, an occurrence of a trigger event;
generating, based on the monitoring information accumulated in the storage unit, search data for searching relevant information related to the trigger event, wherein the relevant information includes an image corresponding to the trigger event, information that indicates a cause of the trigger event, and information that indicates a solution to a problem related to the trigger event;
searching the relevant information by using the search data; and
generating presentation information for presenting the relevant information searched by the searching,
wherein the detecting determines that the trigger event has occurred upon determining that the occurrence of an abnormal state is detected based on a history of the monitoring information, and
wherein the detecting determines that the occurrence of the abnormal state is detected if a decrease of a manufacturing volume in the monitoring target exceeds a predetermined reference.

18. A non-transitory computer-readable storage medium storing a computer program for causing a computer to execute an information presentation method, comprising:
obtaining monitoring information for specifying a state of a monitoring target, which is obtained by monitoring the monitoring target over time;
causing a storage unit to accumulate the obtained monitoring information;
detecting, based on the monitoring information accumulated in the storage unit, an occurrence of a trigger event;
generating, based on the monitoring information accumulated in the storage unit, search data for searching relevant information related to the trigger event, wherein the relevant information includes an image corresponding to the trigger event, information that indicates a cause of the trigger event, and information that indicates a solution to a problem related to the trigger event;
searching the relevant information by using the search data; and
generating presentation information for presenting the relevant information searched by the searching,
wherein the detecting determines that the trigger event has occurred upon determining that the occurrence of an abnormal state is detected based on a history of the monitoring information, and
wherein the detecting determines that the occurrence of the abnormal state is detected if a decrease of a manufacturing volume in the monitoring target exceeds a predetermined reference.

* * * * *